United States Patent
Howard

[11] Patent Number: 5,884,970
[45] Date of Patent: Mar. 23, 1999

[54] RECLINER APPARATUS

[75] Inventor: Timothy L. Howard, Blue Bell, Pa.

[73] Assignee: CounterBalance Corporation, Warminster, Pa.

[21] Appl. No.: 868,840

[22] Filed: Jun. 9, 1997

[51] Int. Cl.$^6$ ................................................ B60N 2/12
[52] U.S. Cl. ........................ 297/362.14; 297/362.11; 297/320; 297/330
[58] Field of Search .................. 297/362.14, 362.12, 297/362.11, 330, 320, 321

[56] References Cited

U.S. PATENT DOCUMENTS

| | | |
|---|---|---|
| 2,498,106 | 2/1950 | Elleman . |
| 2,530,924 | 11/1950 | Turner . |
| 2,673,632 | 3/1954 | Stiranka . |
| 2,931,640 | 4/1960 | Riddle, Jr. . |
| 2,947,350 | 8/1960 | Davis . |
| 3,044,830 | 7/1962 | Kolle . |
| 3,046,055 | 7/1962 | Martens . |
| 3,583,762 | 6/1971 | Striem ........................... 297/362.14 X |
| 4,402,547 | 9/1983 | Weston et al. . |
| 4,669,781 | 6/1987 | Conroy et al. ..................... 297/362.14 |
| 4,685,734 | 8/1987 | Brandoli . |
| 4,872,903 | 10/1989 | Periou ............................. 297/330 X |
| 4,962,963 | 10/1990 | Robinson . |
| 5,052,752 | 10/1991 | Robinson ......................... 297/362.14 |
| 5,199,764 | 4/1993 | Robinson . |
| 5,203,608 | 4/1993 | Tame ................................. 297/320 |
| 5,280,999 | 1/1994 | Jones et al. ..................... 297/362.14 X |
| 5,295,730 | 3/1994 | Rees ............................... 297/362.14 X |
| 5,299,853 | 4/1994 | Griswold et al. ............... 297/362.14 X |
| 5,306,073 | 4/1994 | Rees ................................ 297/362.14 |
| 5,320,413 | 6/1994 | Griswold et al. .................. 297/362.2 |
| 5,335,965 | 8/1994 | Sessini ............................. 297/284.4 |
| 5,349,878 | 9/1994 | White et al. ..................... 297/330 X |
| 5,435,624 | 7/1995 | Bray et al. ....................... 297/362.11 |
| 5,483,853 | 1/1996 | Moradell et al. ................. 297/330 X |
| 5,575,531 | 11/1996 | Gauger et al. ................... 297/362.11 |
| 5,582,461 | 12/1996 | Pickles ............................ 297/362.14 |
| 5,707,112 | 1/1998 | Zinn ............................... 297/362.14 X |

Primary Examiner—Peter M. Cuomo
Assistant Examiner—Rodney B. White
Attorney, Agent, or Firm—Harold James; Robert L. Epstein; James & Franklin, LLP.

[57] ABSTRACT

Apparatus for adjusting the spatial relationship between the bottom and the back of a chair which may be subjected to severe mechanical stress, as in the case of a vehicle crash, the seat and the back being operatively connected respectively to two oppositely threaded portions of a rotatable shaft which is adapted to be rotated in one direction or the other to produce the desired change in spatial relationship, the arrangement providing the combination of exceptional strength in the event of a crash and reduced cost. The operative connection between the chair parts and the shaft includes two non-rotatable parts engaged respectively with the oppositely threaded shaft portions so as to move in and out with respect to the shaft as the latter is rotated, and a housing which permits those parts to thus move while preventing their rotation.

13 Claims, 4 Drawing Sheets

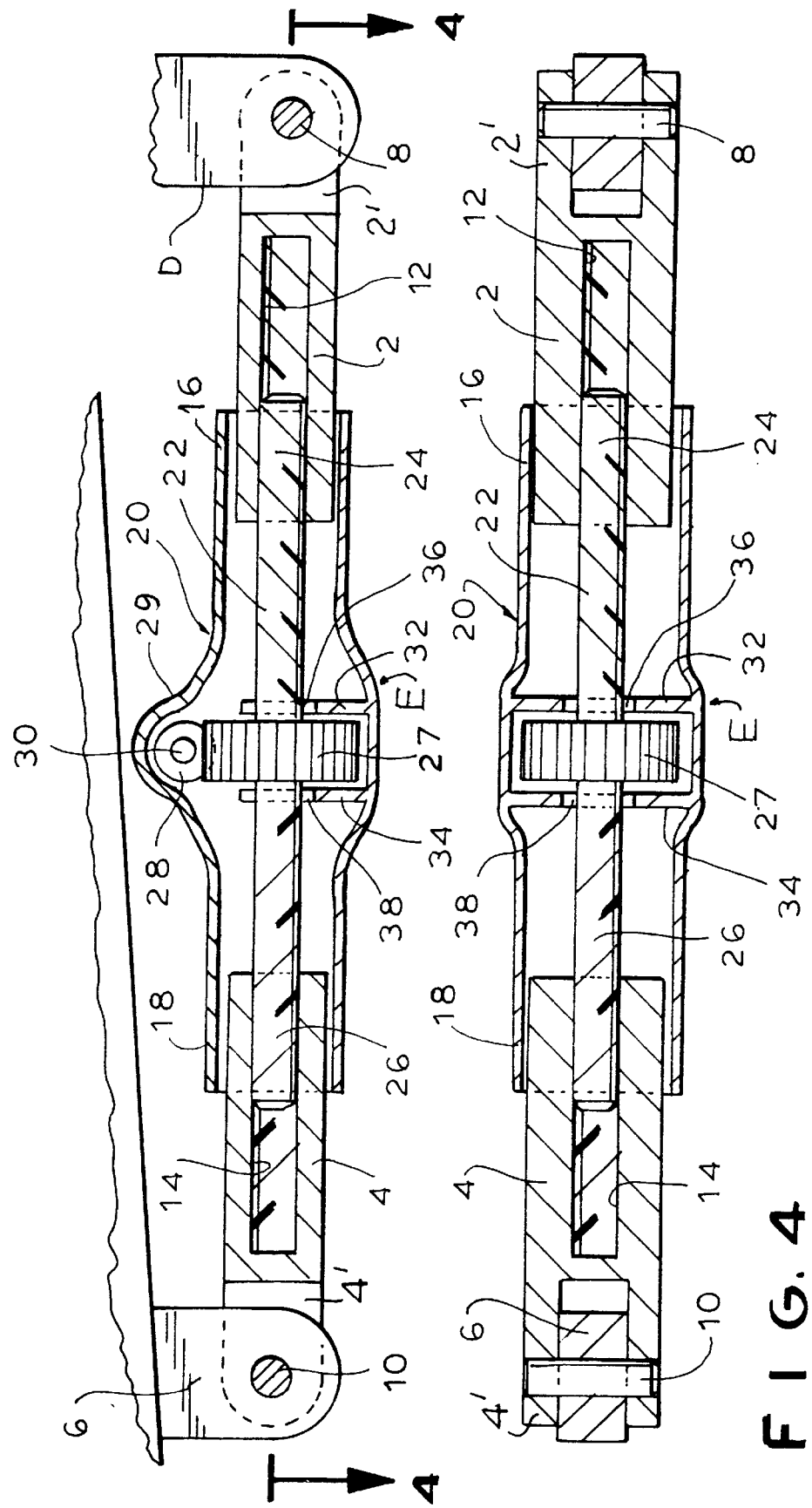

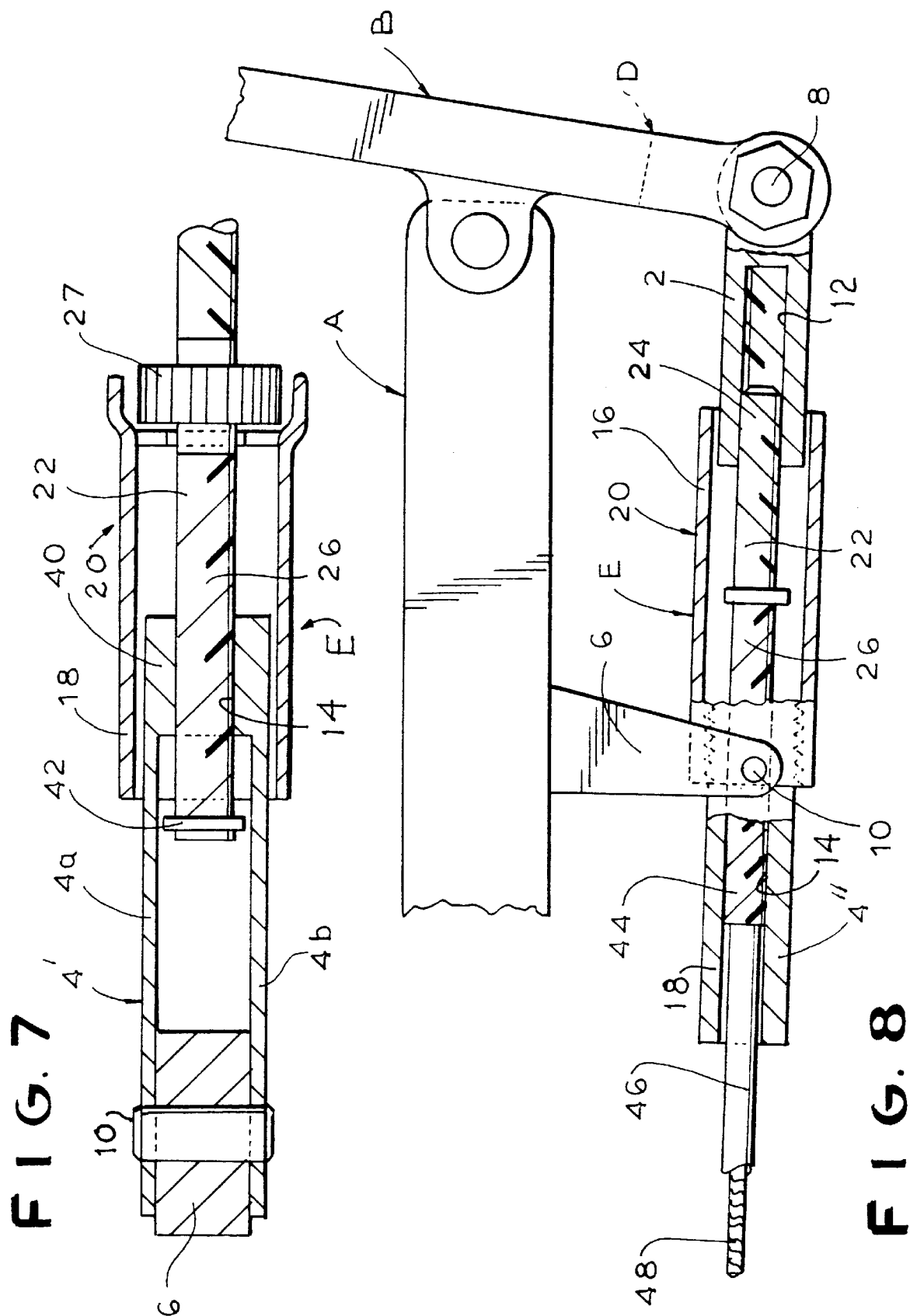

RECLINER APPARATUS

The present invention relates to a mechanism for adjusting the spatial relationship between the bottom and the back of a chair which is particularly resistant to dislocating forces, such as would occur when the chair is in a vehicle (car, train, airplane, etc.) which is involved in a crash or other accident. The change in spatial relationship between the bottom and the back of a chair usually involves a change in the angle of reclination of the back with respect to the seat, so that the individual occupying the chair can sit up or recline, as he desires, and the invention will be here specifically disclosed in connection with such a recliner.

Conventional seat recliner mechanisms have used various devices for adjusting the spatial relationship between the seat bottom and the seat back. Such devices may be actuated manually, by manipulating a handle or rotating a knob, or they may be power driven. Seats of that character are widely used in vehicles, such as automobiles or airplanes. Such vehicles are all too frequently subjected to severe stresses, as in the case of an automobile collision or an airplane crash. While airplane crashes usually involve catastrophic damages which may well destroy the chairs in any event, most automobile collisions or crashes are not of that character, but they still subject the seats in the cars to very severe stresses. It is therefore important that the seats be able to withstand such stresses so as to minimize the cost of repairing the damage attendant upon such a collision.

Conventional seat recliner systems for the automotive industry often consist of a motor which drives a worm gear which in turn rotates a nut on a fixed screw or rotates the screw in conjunction with a fixed nut. There are many drawbacks to those conventional seat recliner systems. They require load bearings for the shaft and complex housings to contain and mount those bearings, and the bearings and housings must themselves be strong enough to withstand the shock of a collision. The driving connections between motor and shaft are also subject to excessive stresses. All of this greatly increases the cost, weight and complexity of the assembly.

Some examples of linear seat reclining systems include U.S. Pat. No. 5,199,764 to Robinson, which discloses a linear, power seat recliner apparatus for controllably adjusting the angular position of a seat back relative to a seat cushion. The apparatus comprises a master recliner having an integrally mounted motor, a slave recliner mechanism, and an actuator cable connecting the slave and master recliner mechanisms for transmitting torque from the motor to the slave recliner mechanism. The motor simultaneously drives each of the recliner mechanisms. The master and slave recliner mechanisms have a threaded rod assembly interconnected to a transmission assembly for providing desired speed reduction and linear reciprocal movement of the rod.

Similarly, U.S. Pat. No. 4,962,963 to Robinson discloses a linear, power seat recliner apparatus. The actuator shown in FIG. 5 of Robinson comprises an electric motor 30 which, through a system of gears, drives a helical gear nut 112. The helical gear nut movement in turn causes linear motion of rod 32. The Robinson device requires bearings within bearing housing assembly 94, which increases weight, cost and complexity of the device.

U.S. Pat. No. 3,583,762 to W. Striem discloses a hand-operated bucket seat back recliner comprising a spindle with a hand reel and oppositely threaded ends which screw into nuts mounted by rubber pieces to absorb the angle changes as the back is adjusted. Turning the hand reel adjusts the relative distance between the nuts, which are respectively connected to the seat bottom and back.

U.S. Pat. No. 5,335,965 to Sessini discloses separate oppositely threaded parts 30 and 33 which are moved toward and away from one another to adjust the lumbar back support in a seat.

Examples of other seat recliner systems include Brandoli U.S. Pat. No. 4,685,734, Elleman U.S. Pat. No. 2,498,106, Rees U.S. Pat. No. 5,295,730, Bray U.S. Pat. No. 5,435,624 and Weston U.S. Pat. No. 4,402,547.

In none of these patents are dislocative stresses adequately and simply taken care of, particularly where an external power drive such as an electric motor or the like is employed. Efforts to minimize the transfer of loads to the motor parts specifically involve use of extensive and complicated bearings and bearing housings. There is thus a need for an economical design for a linear power seat recliner system which is capable of withstanding severe mechanical stresses.

SUMMARY OF THE INVENTION

It is a prime object of the present invention to devise a seat recliner system which at minimum cost is capable of withstanding maximum and dislocative force.

It is a further prime object of the present invention to devise a power seat recliner system in which the operational loads and the loads produced by collision or the like are neither transmitted to the motor which drives the system nor to costly and essentially fragile bearings and bearing housings.

As a corollary to the above, it is an important object of the present invention to devise a recliner drive which, because of the strength inherent in the arrangement of the parts, enables those parts and their housing to be made of relatively inexpensive materials such as plastic or relatively inexpensive metals.

To these ends, the system of the present invention utilizes a shaft having first and second portions which are oppositely threaded, with inwardly and outwardly moving elements at both ends thereof threadedly engaging those oppositely threaded portions, those parts being non-rotatably received within a housing and those parts in turn being operatively connected to the chair bottom and back respectively. External means, such as a motor, is drivingly connected to the shaft so as to rotate the latter, as, for example, by a worm and gear arrangement within the housing or a driving cable connected to an end of the shaft. Forces applied to the assembly, such as those forces acting on the chair bottom and back respectively, will be taken up by the shaft structure itself and the threaded engagement between that shaft and the parts connected to the bottom and back respectively. The shaft itself is structurally strong, as is the threaded engagement, particularly if a fine thread is employed, the exerted forces are taken up by the shaft structure, since special bearings for the shaft are not required, and thus forces are not transmitted to any bearing, nor are such forces transmitted to the driving motor, thus making the structure exceedingly sturdy and exceedingly simple.

This engagement therefore has many advantages over the prior art. With the motor positioned remote from the forces exerted on the shaft either when it is operated in normal fashion or when it is subjected to serious dislocative forces, it is the shaft itself which takes up those forces, and since it is a unitary structure it can do that very efficiently. In addition, the design of the housing is greatly simplified and the use of delicate bearings is entirely eliminated. The simplified structure further eliminates the need for periodic adjustments of the mechanism. Thus improved operation is accomplished at lower cost while at the same time achieving greater safety and reliability.

To the accomplishment of the above, and to such other objects as may hereinafter appear, the present invention relates to the design of a direct load recliner device as defined in the appended claims and as described in this specification, taken together with the accompanying drawings, in which:

FIG. 3 is a cross-sectional view on an enlarged scale of the recliner arrangement of FIG. 1 taken in the vertical plane;

FIG. 4 is a cross-sectional view taken along the line 4—4 of FIG. 3;

FIG. 7 is a cross-sectional view of one end of the recliner assembly of FIGS. 1–6 showing an alternate construction for the part extending from the housing and adapted to be secured to the seat bottom or back; and FIG. 8 is a cross-sectional view of an alternate construction in which the shaft is adapted to be driven from its end rather than from a gear located within the housing.

Figure 1:
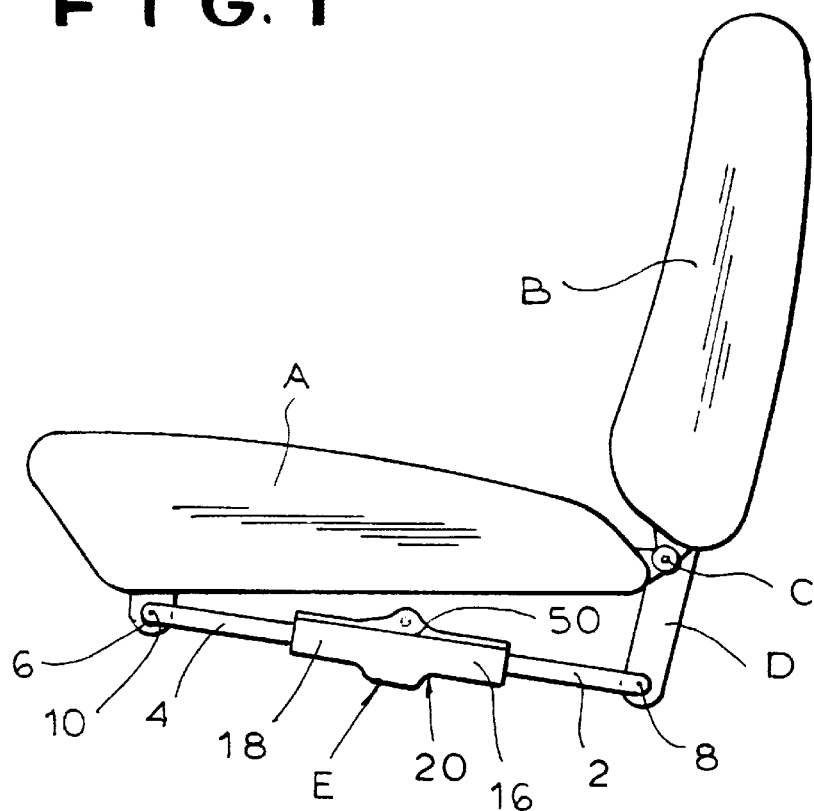
FIG. 1 is a side elevational view of a typical chair with a bottom and a reclinable back, to which a first embodiment of the present invention is attached, the chair being shown with its back in an upright position.
Figure 2:
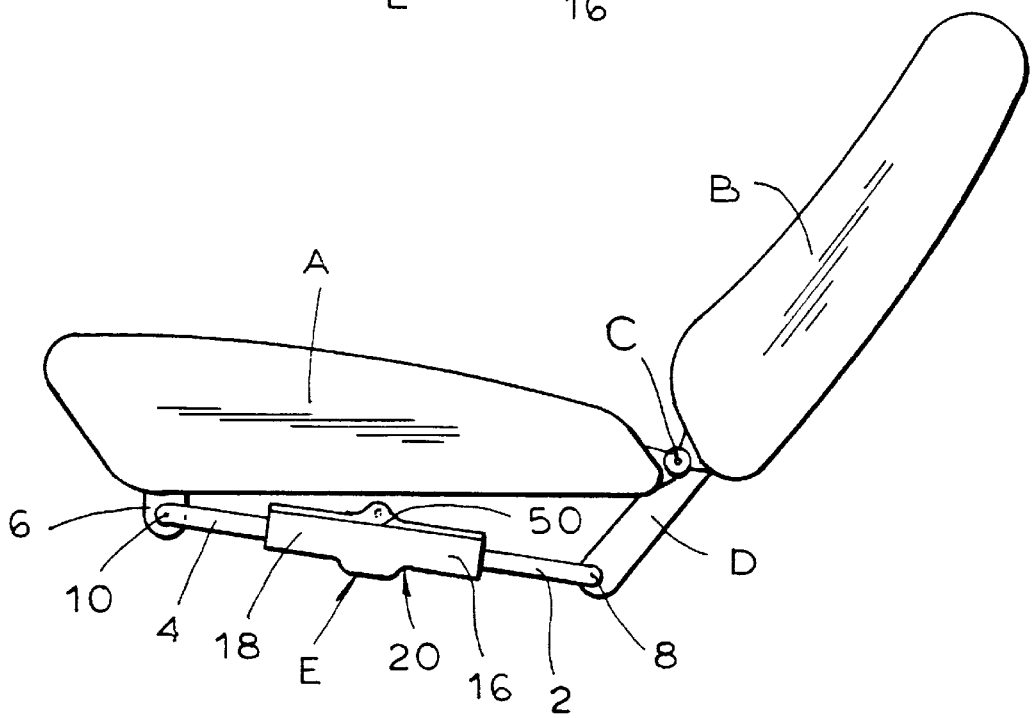
FIG. 2 is a view similar to FIG. 1 but with the back in a reclining position.
Figures 5, 6:
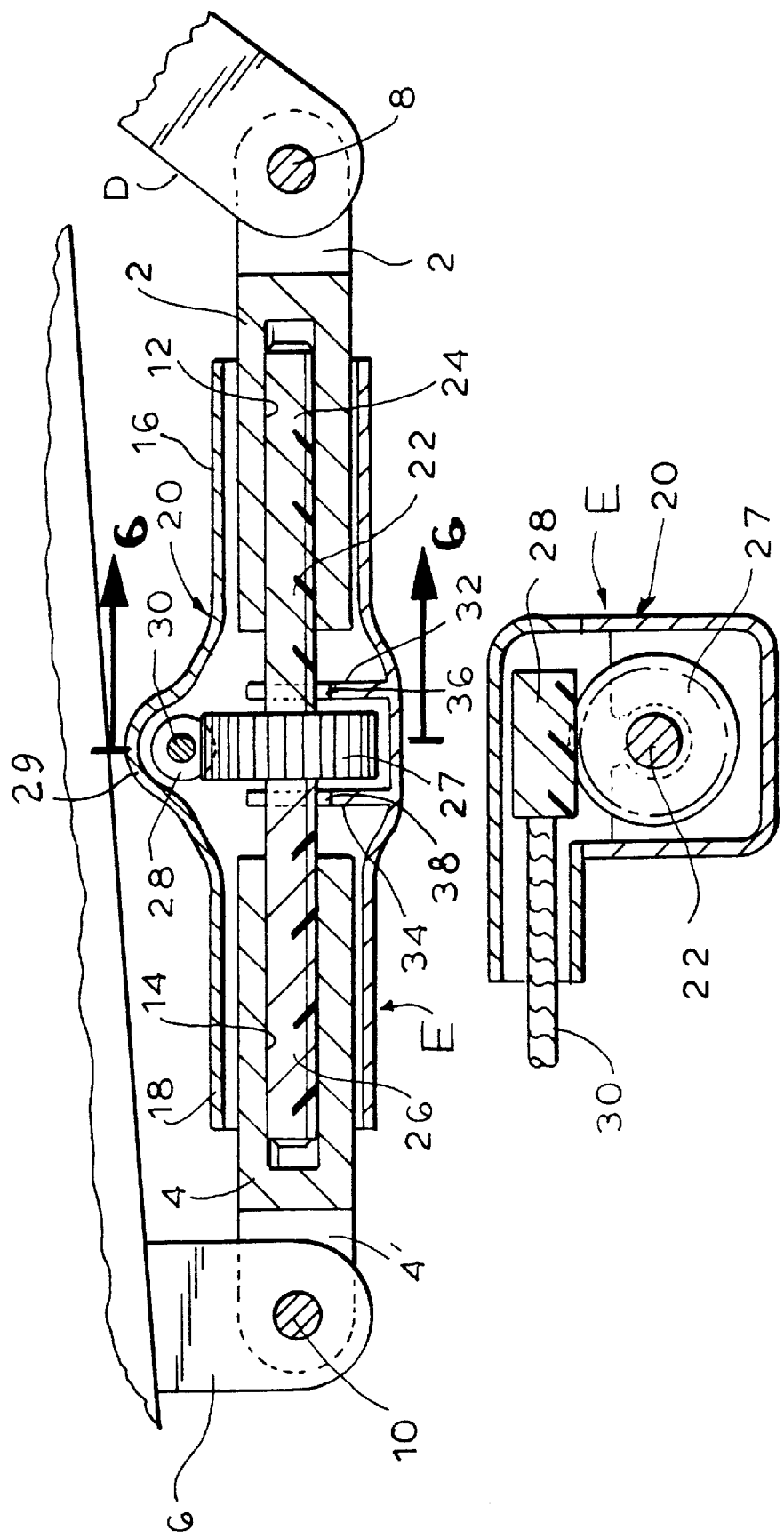
FIG. 5 is a cross-sectional view similar to that of FIG. 3 but showing the parts in the positions they assume in FIG. 2.
FIG. 6 is a cross-sectional view taken along the line 6—6 of FIG. 5.

Turning first to the embodiment of FIGS. 1–6, a chair is provided with a seat generally designated A and a back generally designated B connected together by a pivotal connection at C so that the back B can move between the upright position of FIG. 1 and the reclining position of FIG. 2. In order to move the back B between those two positions it is provided with a rigidly attached downwardly projecting part D. The recliner drive, generally designated E, is connected at one end to the part D by a rod 2 and connected by rod 4 at its other end to part 6 rigidly depending from seat A. These connections are effected by means of pivot pins 8 and 10 respectively in the manner of a clevis. Each of the rods 2 and 4, at their ends remote from the pins 8 and 10, are provided with inwardly extending elongated recesses 12 and 14 respectively, each of which is oppositely internally threaded. The inner ends of the rods 2 and 4 are preferably non-circular in cross-section (e.g., rectangular) and are slidably received within matingly cross-sectionally shaped (e.g., rectangular) ends 16 and 18 respectively of a housing generally designated 20 so as to be freely slidable into and out of those ends but being non-rotatable relative thereto. Any appropriate structure may be employed to produce that non-rotating slidable effect.

Within the housing 20 is a shaft 22 having opposite end portions 24 and 26 which are oppositely externally threaded and which operatively engage with the correspondingly internally threaded portions of the recesses 12 and 14. A gear 27 is fixed to the shaft 22, preferably at an intermediate point. The upper wall of the housing is raised, at 29, to receive a worm 28 which engaged with the gear 27, that worm, as may best be seen from FIG. 6, being driven in rotation by a drive shaft 30, which may be flexible and which is designed to be rotated by some outside force such as the hand of the operator or, preferably, an electric motor which may be mounted wherever desired.

When the drive shaft 30 is rotated the worm 28 causes the gear 27, and hence the shaft 22, to rotate and that, depending upon the direction of rotation, will cause the rods 2 and 4 to move toward and away from one another and hence into and out from the housing 20, and that, in turn, will cause the seat back B to change its orientation. Although movement of the back B between the positions of FIGS. 1 and 2 will cause the vertical position of the pin 8 pivotally connecting the parts 2 and D to move vertically as well as laterally, the housing 20 and all of the other parts will freely adapt to that movement. Any external force exerted on the back B, for example, such as that attendant upon a collision in which the chair-carrying vehicle is involved, will be directed through the threaded interengagement of the parts directly along the axis of the shaft 22 which, being a sturdy and preferably integral part, is thoroughly capable of absorbing such stresses without damage, particularly when fine-pitched threads are employed.

It is noteworthy that the shaft 22 requires no special bearings. It is carried by the rods 2 and 4 which in turn are carried by the housing 20. However, it has been found advantageous, in order to minimize lateral strains on any part of the assembly, to provide the housing 20 with upwardly extending members 32 and 34, each with an upwardly extending notch 36 and 38 respectively, into which notches the shaft 22 is relatively freely received, thus assisting and fixing the position of the shaft 22 and the rods 2 and 4 within the housing 20.

In the embodiment specifically illustrated in FIGS. 3–6, the outwardly extending ends 2' and 4' respectively are forked so as to receive between them the parts D and 6 respectively. FIG. 7 illustrates an alternative construction. It shows only one end of the housing, it being understood that the other end can be, but need not be, correspondingly constructed. In FIG. 7 the rod 4' is defined by an end section 40 of abbreviated length which is internally threaded so as to engage the externally threaded shaft end 26, but the left-hand portion of the rod 4', over most of its length, is defined by two wall parts 4a and 4b between which the part D or 6 (in the illustrated case, 6) is received and pivotally mounted. The extreme end of the shaft 22 extends into the space between the wall parts 4a and 4b and may be provided with a washer 42 at its end so as to prevent the rod 4' from escaping its engagement with the shaft 22.

The housing E not only houses the parts and protects them from dirt and the like but also properly supports the rods 2 and 4, and with them the shafts 22, so that they can perform the desired reclining operation. Undesirable and possibly catastrophic external forces axially load the rods 2 and 4 and that axial load is taken up by the shaft 22, so that the housing is not subjected to any of those loads, nor are any costly or delicate bearings required. Hence the housing can be made of plastic or other low cost material. The housing may be in two parts, as indicated by the parting line 50 in FIGS. 1 and 2, and because the housing does not itself take any stresses it does not require high strength assembly fasteners, but may be assembled using low cost "snap together" techniques. The simple structural parts 32 and 34 continuously align the housing with the parts received therein.

In the embodiment of FIGS. 1–7 the driving force to cause the recliner to operate comes in from the side of the housing E. In the embodiment of FIG. 8 it comes in from the end of the housing E. As there disclosed the housing E is in the form of a simple casing of preferably non-round cross-section which is fixed to the rod 4" which extends out beyond the left-hand end of the housing E. That rod 4" is provided with an axial passage 44 completely therethrough, also preferably of non-circular cross-section, into which is received a correspondingly shaped sheath 46 within which is a rotatable drive shaft 48, the end of that drive shaft 48 being fixed to the end of the shaft 22. The externally threaded shaft portion 26 is threadedly received within the inner portion of the passage 44, which is appropriately internally threaded. The end 24 of the shaft 22 engages with the part 2 which is similar to that disclosed in the earlier embodiments and which moves longitudinally freely but non-rotatably with respect to the housing E.

In the embodiment of FIG. 8 the need for driving and driven gears is eliminated, and the elimination of the gear 27 and worm 28 of the first described embodiment enables the connections between the recliner mechanism and the chair parts D and 6 respectively to be located closer to one another than is feasible with the embodiments of FIGS. 1–7. This improves the load-carrying capability of the recliner by increasing its buckling strength stability.

While but a limited number of embodiments of the present invention have been here disclosed, it will be apparent that many variations may be made therein, all without departing from the spirit of the invention as defined in the following claims.

I claim:

1. Recliner apparatus for use with a chair having a bottom and a back articulately mounted relative to said bottom, said apparatus comprising a housing having openings at generally opposite locations, a shaft rotatably received in said housing and having first and second portions which are oppositely threaded, first and second elements operatively connected to said housing, respectively extending outwardly from said openings, engaging said housing in a rotation-preventing manner, and movable toward and away from one another, said first and second elements being oppositely threaded and respectively engaging said oppositely threaded first and second shaft portions, one of said elements being adapted to be operatively connected to said chair bottom and the other said element being adapted to be operatively connected to said chair back, and drive means operatively connected to said shaft to rotate the shaft, thereby to cause said elements to move toward and away from one another as said shaft is rotated in one direction or the opposite direction to cause said chair back to articulate relative to said chair bottom.

2. The recliner apparatus of claim 1, in which both of said elements are received at least in part in said housing and are movable in and out relative thereto through said openings respectively, said chair bottom is adapted to be connected to a portion of one of said elements which extends from said housing and said chair seat is adapted to be connected to a portion of the other of said elements which extends from said housing.

3. The recliner apparatus of claim 1, in which said housing and one of said elements are operatively fixed to one another and adapted to be operatively connected to one of said seat and said bottom, the other of said elements being received at least in part in said housing and movable in and out through one of said housing openings, and said chair bottom being adapted to be operatively connected to said other of said elements outside said housing.

4. The recliner apparatus of any of claims 1, 2 or 3, in which each of said elements is provided with an internally threaded recess extending generally axially from an inwardly facing end thereof, said recesses being oppositely threaded, and said oppositely threaded shaft portions being received within said recesses respectively.

5. In the recliner apparatus of either of claims 1 or 2, means in said housing engaging said shaft to inhibit said shaft from shifting in position when it is rotated.

6. The recliner apparatus of claim 5, in which said shaft engaging means comprises at least one member fixed to said housing and having an upwardly extending notch into which said shaft is received.

7. The recliner apparatus of claim 6, in which said shaft has a gear affixed thereto and said shaft engaging means comprises two of said members engaging said shaft on opposite sides of said gear.

8. The recliner apparatus of claim 6, in which said shaft has a gear affixed thereto between said oppositely threaded shaft portions and said shaft engaging means comprises two of said members engaging said shaft on opposite sides of said gear.

9. The recliner apparatus of either of claims 1 or 2, in which said shaft has a gear affixed thereto and said drive means includes an element within said housing drivingly operatively connected to said gear.

10. The recliner apparatus of either of claims 1 or 2, in which said shaft has a gear affixed thereto between said oppositely threaded shaft portions and said drive means includes an element within said housing drivingly operatively connected to said gear.

11. The recliner of either of claims 1 or 3, in which said drive means is drivingly operatively connected to an end of said shaft.

12. The recliner apparatus of claim 11, in which one of said elements has a free end with a longitudinal passage extending thereto from the free end thereof and said drive means comprises a rotatable driving shaft extending through said passage.

13. The recliner apparatus of claim 12, in which said driving shaft is rotatable within a sheath which is non-rotatably received within at least a portion of said longitudinal passage.

* * * * *